DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 30, 1970

875 O.G. 713

T875,025

PACKAGING FOR PHOTOGRAPHIC FILM

Clifford B. Bushnell, 746 Oakridge Drive; Heinz C. Altmann, 58 Bristol Ave.; and Henry L. West, 169 Rosemont Drive, all of Rochester, N.Y. 14617

Filed Oct. 13, 1969, Ser. No. 865,577
Int. Cl. B65d *85/67*
U.S. Cl. 206—52
1 Sheet Drawing. 4 Pages Specification

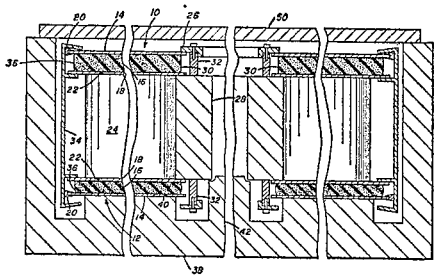

A roll of film (24), especially a large flangeless one, is readied for "vertical axis" handling as follows: Top and bottom flanges (10, 12) are secured to the roll hub (28) while the axis of the roll is horizontal. Each flange has a protective semi-rigid member (14), a resilient member (18), and compressible foam (16) sandwiched therebetween. A band (34) provides a light-tight seal for the film (24). The roll is tilted so that its axis is vertical; and then placed in a container (38). The container (38) has a raised surface (40) on which the rigid member (14) of the flange (12) rests, thereby compressing the foam material of such flange to apply uniform pressure across the side face of the film roll (24). The above described package protects film from dirt contamination and the like.

June 30, 1970 C. B. BUSHNELL ET AL T875,025
PACKAGING FOR PHOTOGRAPHIC FILM
Filed Oct. 13, 1969
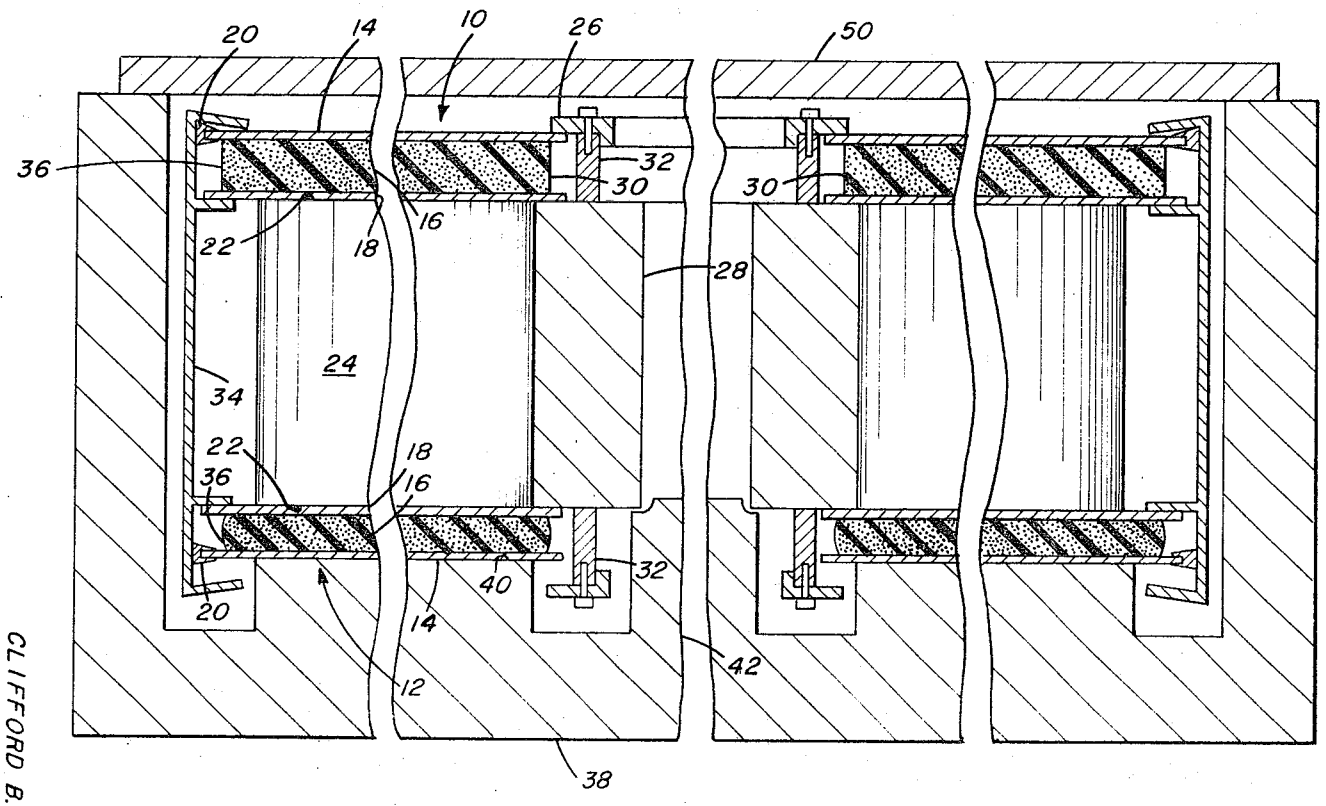
CLIFFORD B. BUSHNELL
HEINZ C. ALTMANN
HENRY L. WEST
INVENTORS
BY Walter O. Hodsdon
Robert T. Cody
ATTORNEYS